(12) United States Patent
Stanis et al.

(10) Patent No.: US 11,190,847 B2
(45) Date of Patent: *Nov. 30, 2021

(54) VIDEO TEXTBOOK ENVIRONMENT

(71) Applicant: My JoVE Corporation, Cambridge, MA (US)

(72) Inventors: Jessica Jo Stanis, Hudson, MA (US); Richard P. Medeiros, Lynn, MA (US); Dipesh Mukesh Navani, Ashland, MA (US); Justin J. Cherny, Melrose, MA (US); Moshe Pritsker, Melrose, MA (US)

(73) Assignee: My JoVE Corporation, Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/017,598

(22) Filed: Sep. 10, 2020

(65) Prior Publication Data

US 2020/0413148 A1 Dec. 31, 2020

Related U.S. Application Data

(63) Continuation of application No. 16/023,695, filed on Jun. 29, 2018, now Pat. No. 10,785,540.

(51) Int. Cl.
*H04N 21/472* (2011.01)
*H04N 21/8547* (2011.01)
(Continued)

(52) U.S. Cl.
CPC ..... *H04N 21/47217* (2013.01); *G06F 3/0483* (2013.01); *G06F 40/169* (2020.01); *G09B 5/065* (2013.01); *H04N 21/8547* (2013.01)

(58) Field of Classification Search
CPC ......... H04N 21/47217; H04N 21/8547; G06F 40/169; G06F 3/0483; G09B 5/065
See application file for complete search history.

(56) References Cited

U.S. PATENT DOCUMENTS

| 6,389,434 | B1 | 5/2002 | Rivette |
| 9,910,916 | B1 | 3/2018 | Tseng |

(Continued)

OTHER PUBLICATIONS

International Search Report and Written Opinion, PCT/US2019/047426, dated Nov. 18, 2019, 6 pages.

*Primary Examiner* — Mishawn N. Hunter
(74) *Attorney, Agent, or Firm* — Nelson Mullins Riley & Scarborough LLP; Anthony A. Laurentano

(57) ABSTRACT

A video textbook environment may provide video textbooks for students in various classes at various institutions. The video textbook environment may provide a web interface that displays videos and enables students to take notes regarding the videos. The student may request bookmarks be placed on a video. These bookmarks may be selected to return the video to the designated portion associated with the bookmark. The notes may be timestamped to correspond with a video counter value, such as where a bookmark is positioned. In this fashion, a student's notes may be associated with a given location in the bookmark. Notes may be aggregated for partitions of the video textbook. In particular, notes can be stored in a database a query may be issued to aggregate notes for a selected partition. The notes may then be displayed or downloaded to a user, such as a student.

7 Claims, 21 Drawing Sheets

(51) Int. Cl.
*G06F 3/0483* (2013.01)
*G09B 5/06* (2006.01)
*G06F 40/169* (2020.01)

(56) References Cited

U.S. PATENT DOCUMENTS

| | | |
|---|---|---|
| 10,785,540 B2 | 9/2020 | Stanis et al. |
| 2006/0047639 A1 | 3/2006 | King et al. |
| 2011/0019020 A1 | 1/2011 | King et al. |
| 2011/0065082 A1* | 3/2011 | Gal .................... G09B 7/02 434/365 |
| 2012/0216101 A1 | 8/2012 | Yonemoto |
| 2013/0031208 A1 | 1/2013 | Linton |
| 2013/0122980 A1* | 5/2013 | Lachina ............... G09B 5/00 463/9 |
| 2014/0089413 A1 | 3/2014 | Evans |
| 2014/0115436 A1 | 4/2014 | Beaver |
| 2014/0120516 A1 | 5/2014 | Chiang et al. |
| 2014/0281903 A1 | 9/2014 | Le Chevalier |
| 2015/0007013 A1 | 1/2015 | Toh |
| 2015/0301706 A1 | 10/2015 | Logan |
| 2016/0035230 A1 | 2/2016 | Spaulding |
| 2016/0042654 A1* | 2/2016 | Fieldman ............ G09B 7/00 434/219 |
| 2017/0053449 A1 | 2/2017 | Lee |
| 2017/0053543 A1 | 2/2017 | Agrawal et al. |
| 2017/0124039 A1 | 5/2017 | Hailpern |
| 2017/0337164 A1 | 11/2017 | Longdale |

* cited by examiner

CHAPTER 19
Sensory Systems

| KEY TERMS AND CONCEPTS | RELATED RESEARCH TECHNICS | SCIENTISTS IN ACTION |

19.34: Finding Your Blindspots

In the back of everyone's eye is a small piece of neural tissue called the retina. The retina has photosensitive cells that respond to ...

19.35: Rubber Hand Illusion

Our physical actions - whether we are reaching for objects or walking without hitting obstacles - depend on an ability to perceive our own ...

*Fig. 4*

| COREBIO ▼ | VIDEO | NOTES | ASSIGNMENTS & QUIZZES | SYLLABUS & RESOURCES | 🔍 ○ ▼ |
|---|---|---|---|---|---|

1602 — Class Materials

| | | |
|---|---|---|
| 📄 BIO 101 Syllabus | Doc | January 12 |
| 📄 Required Texts and Materials | Doc | January 12 |

1604 — Lecture Notes

| | | |
|---|---|---|
| 📊 January 23 Class Slides | Slides | January 23 |
| 📊 January 21 Class Slides | Slides | January 21 |
| 📊 January 19 Class Slides | Slides | January 19 |
| 📊 January 17 Class Slides | Slides | January 18 |

1606 — Additional Resources

| | | |
|---|---|---|
| ▶ Genetics Light Board | Video | January 14 |
| 📄 Biology Lingo for Those in the Know | Doc | January 14 |
| 🔗 Cloning: What could go wrong? | Link | January 14 |
| ▶ Theoretical Photosynthesis | Video | January 14 |
| 🔗 Polymerase Chain Reaction and You | Link | January 14 |

VIDEO TEXTBOOK ENVIRONMENT

RELATED APPLICATIONS

The present application is a continuation of U.S. patent application Ser. No. 16/023,695, filed on Jun. 29, 2018, the contents of which are herein incorporated by reference in their entirety.

BACKGROUND

Textbooks conventionally have been paper books that are bound and provided to students. These textbooks are organized into chapters and may include illustrations as well as text. Such textbooks may be cumbersome since many of them are heavy and difficult to transport. Moreover, such textbooks may be easily lost by students. Still further, such textbooks are limited in the content they convey to a user. Specifically, the content is typically limited to text and graphical images.

SUMMARY

In accordance with an exemplary embodiment, a method is performed by at least one processor of a computer video textbook environment. The method includes outputting a video as part of a web interface for a video textbook and a designated portion of the web interface. The video relates to a topic for the video textbook. A timestamp reflective of a location of the video is added to notes entered by a party regarding the video via a notes section of the web interface. The notes are stored with the timestamp in a storage. The notes are retrieved with the timestamp for display on the web interface. In response to the retrieving, the video is cued for output in the designated portion of the web interface starting at the timestamp. In addition, the notes are displayed on the web interface. The notes may include a user id of the party that is stored with the notes. Information that is indicative of the identity of the video may also be stored with the notes. The timestamp may be added responsive to an action of the party. One example of the action of the party is activation of the user interface element. The current time and date may be added to the notes before the notes are stored.

A non-transitory computer readable storage medium that stores instructions that are executable by a processor for performing this method may be provided in some exemplary embodiments.

In accordance with an exemplary embodiment, a method is performed by at least one processor of a computer video textbook environment. In this method, notes regarding a first video of a video textbook are received. The notes are entered via a web interface for a video textbook environment. The video textbook is partitioned into partitions. The notes regarding the first video are stored in a database on a storage and information identifying that the first video belongs to a selected partition of the partitions of the video textbook is also stored. Notes regarding a second video of the video textbook are received via the web interface and stored in the database. Information identifying that the second video belongs to the selected partition is also stored in the database. A query is issued to the database to retrieve notes stored for the selected partition. Notes regarding the first video and notes regarding the second video are received in response to the query.

The received notes may be forwarded to a party via the web interface. The partitions may include at least one of chapters, sections or lessons.

A non-transitory computer readable storage medium may store instructions executable on a processor for performing this method.

In accordance with some exemplary embodiments, a method is performed by at least one processor of a computer video textbook environment. The method includes outputting a video regarding a topic via web interface for a video textbook. A request is received from a party to add a bookmark to a particular point in the video. In response to the request in the party, the bookmark is added to the video. In response to selection of the bookmark, the video is cued to the point associated with the bookmark. The bookmark may comprise a visual element on the web interface. The visual element may be, for example, an icon position on a timeline for the video. The visual element may be activatable to select the bookmark.

A non-transitory computer readable storage medium may store instructions executable on a processor for performing this method.

BRIEF DESCRIPTION OF THE DRAWINGS

FIG. 4 illustrates an example of related research techniques for a chapter of a video textbook.

FIG. 16 illustrates an example of an interface that holds class materials, lecture notes and additional resources.

FIG. 17 illustrates an example of an interface that holds information regarding upcoming quizzes and assignments and past quizzes.

FIG. 18 illustrates an example of an interface that includes a listing of newly assigned matters as well as announcements.

DETAILED DESCRIPTION

Figure 1:
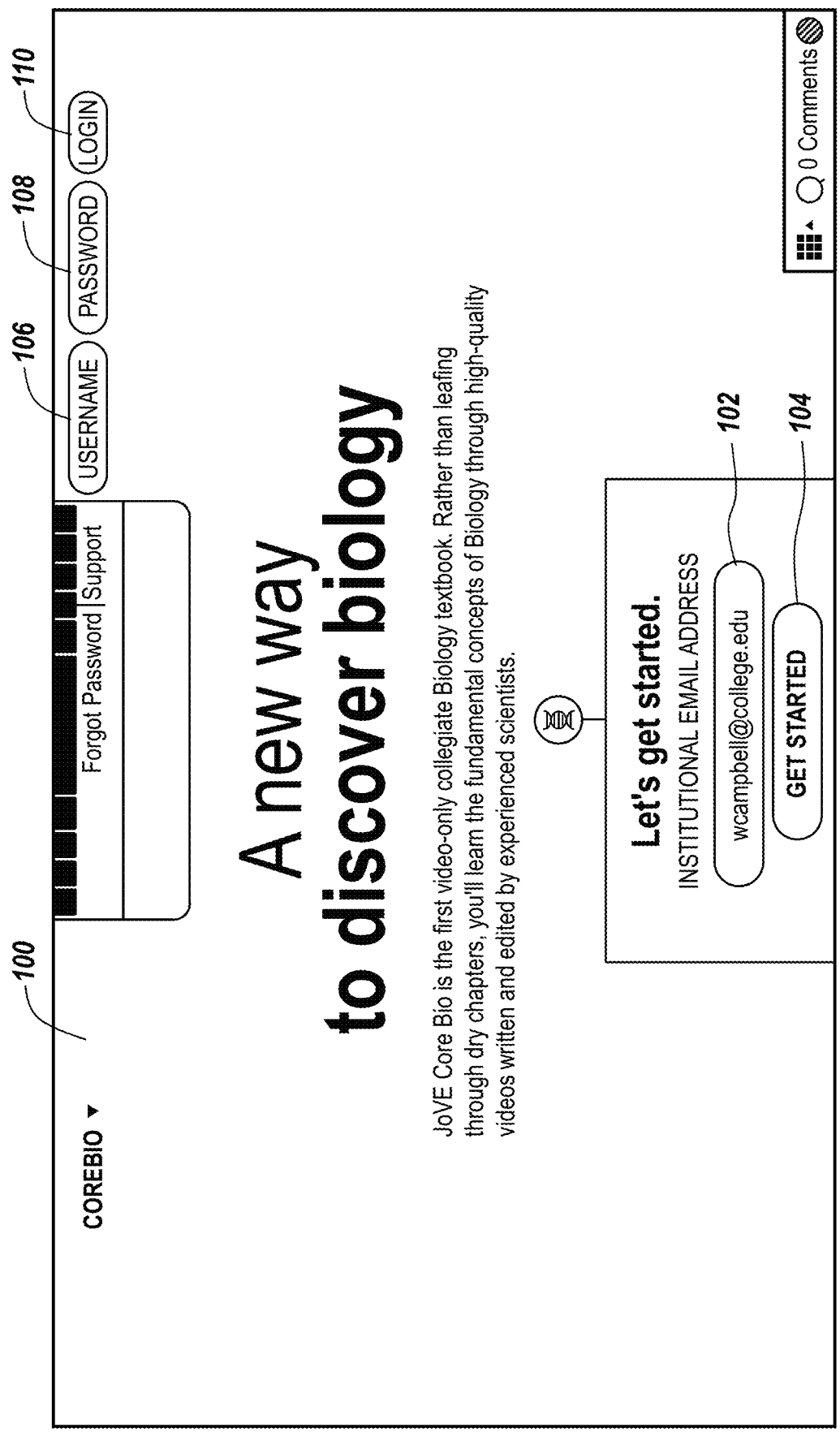
FIG. 1 provides an initial screen of a video textbook in accordance with an exemplary embodiment.

The exemplary embodiments herein provide a video textbook environment. The video textbook environment may be used to gain access to video textbooks. The video textbooks are akin to conventional paper textbooks but include the additional content of embedded videos as the primary vehicle for delivering content to users. The video textbook may be accessed by a computer and thus there is no need for a student to carry a heavy textbook and keep tabs on the whereabouts of the textbook. The video textbook environment may provide the video textbooks to multiple students for multiple classes at different educational institutions. The video textbook environment provides a mechanism for keeping track of the appropriate textbooks for each of the classes at respective institutions in which the video textbooks are used.

As will be described in more detail below, the video textbooks are logically partitioned into partitions, such as chapters. The chapters may be further divided into sections, and the sections may be further divided into lessons. Alternatively, different logical partitions may be applied to the material in a video textbook. The user may traverse the chapters in sequential order or may view only selective sections or lessons. The instructor of the class is given the option of selecting which chapters, sections and/or lessons are assigned to students in the class.

The student is given options via the user interface to watch videos on relevant topics and to take notes regarding the videos via the interface. These notes may be stored for subsequent retrieval. In some exemplary embodiments, the notes for different partitions may be aggregated and made available to the student. For example, the notes of a single chapter may be aggregated and made available to a student. Still further, notes taken for multiple chapters may be aggregated. This may be especially useful in preparing for tests that span chapters, such as midterm examination or final examinations.

In some exemplary embodiments, a student may bookmark a video at a given point in the video. The bookmark may be subsequently accessed to return to that point in the video. The bookmark may be represented by a user interface element, such as an icon. This allows a student to return to a portion of a video that is of interest after having previously watched the video.

In some exemplary embodiments, a student may timestamp their notes by selecting a user interface element. The timestamp represents a position in the video to which the notes relate. The timestamp may be manifest as a video counter or timer value. This allows a user to correlate the notes with the content in the video. This may be helpful when reviewing information for tests or for reinforcement of the lessons.

The video textbook environment may also provide facilities for an instructor of the class. The facilities may include the ability to post assignments, class materials and quizzes to be taken online by students. The instructor may also post test results or quiz results to the students via the video textbook environment. The video textbook environment may provide a roster of students for a given class.

The video textbook environment may also provide messaging capabilities, such as email messages, online chat or other communication mechanisms. This may allow the instructor to communicate with the students or for students to communicate with each other.

The embodiments described below relate to a distributed implementation in which the user interface is provided over a network such as the Internet. Nevertheless, it should be appreciated that in some embodiments the video textbook environment may be provided locally on a user's machine.

FIG. 1 shows an example of an initial screen that may be displayed as part of the interface to a student by the video text book environment. The initial screen 100 includes a location 102 for entering an institutional email address and a "Get Started" button 104 for passing the email address on to the video textbook environment. The students institutional email address is used as an identifier. The user may configure his/her account, including choosing a particular user name or password. For users that have already configured an account, the user may enter the video textbook environment entering a user name 106 and a password 108 and then selecting the login button 110.

Figure 2:
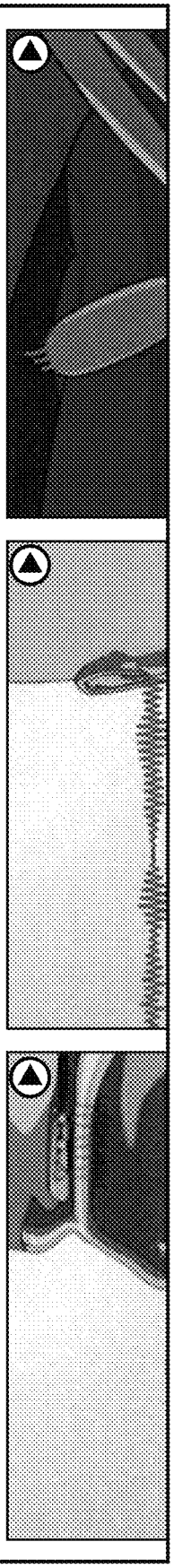
FIG. 2 illustrates a table of contents for a video textbook.

In the exemplary case illustrated herein in FIG. 1, the video textbook is for a biology class taught by an instructor at a given institution. As was mentioned above, a user may navigate through the textbook in sequential order or in a random access fashion. In order to facilitate easier navigation, the video textbook environment may provide a user interface element, to display the table of contents. For example, hovering over "video" may cause the table of contents to be displayed in some embodiments. In example shown in FIG. 2, the contents are organized by units, such as "Fundamentals" and "Cellular Process" with corresponding chapters under those topics. The video textbook environment may provide a number of different ways to navigate to the various chapters and sections of the chapters.

Figure 3:
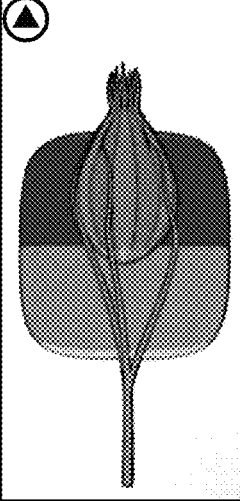
FIG. 3 illustrates an example of key terms and concepts for a chapter of a video textbook.

FIG. 3 shows an example of the interface 300 after a user has selected to navigate to chapter 19 directed to "Sensory Systems." Under each chapter, there are tabs for different topics. In the example shown in FIG. 3, a user has selected the "Key Terms and Concepts" tab 302. By selecting tab 302, the user may review the key terms and concepts that are included in the chapter. This tab shows the various sections of the tab with a title and a brief summary for each section 304 as well as a thumbnail 306 of a video. Clicking on the thumbnail will take you to a page where the video may be played.

As shown in FIG. 4, the user may also select the "Related Research Techniques" tab 402. This displays content that concerns research techniques that relate to the topic of the chapter. As shown in FIG. 4, the interface 400 displays two related research techniques. Each related research technique includes a section 404 with a title and summary and a section with a thumbnail of a video 406.

Figure 5:
FIG. 5 illustrates an example of related research items that relate to a chapter of a video textbook.

A user may choose the "Scientists in Action" tab 502 on the interface 500 (FIG. 5). This displays a number of pertinent topics relating to research and other activities by scientist concerning the topics of the chapters. The entries have a title 504 and summary as well as a thumbnail of a video 506.

As was discussed above, the video textbook may be divided into a number of logical partitions. The logical partitions may include chapters as well as sections and lessons. In the example shown in FIG. 6, the interface 600 displays content for chapter 19, section 5 relating to hearing. A video 602 is available for playing by the user. The user also may have a transcript of the video 608 displayed so that the user can follow along while the video plays. The interface 600 may also include a note taking section 610, which will be described in more detail below. The user may enter notes in the section 610 for later storage and retrieval.

Figure 6:
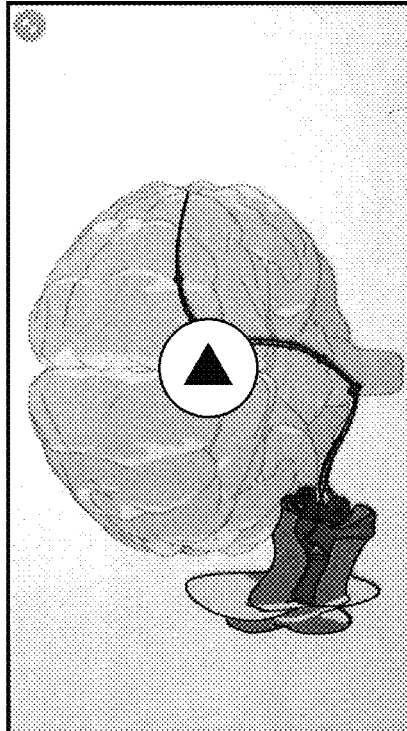
FIG. 6 illustrates an example of a screen in which a video is displayed along with the transcript of video and notes relating to the video.

FIG. 6 also shows that the interface 600 may display a thumbnail image or avatar 608 for a user. Moreover, the interface 600 may display an icon 610 for messages that may indicate whether there are any unread messages. In the example shown in FIG. 6, there is one unread message waiting to be read by the user.

Figure 7:
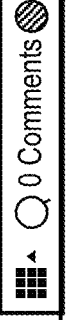
FIG. 7 illustrates an example of textual content provided in the video textbook as well as a listing of concepts to review.

As shown in FIG. 7, the video textbook may also include written content 702. In the example shown in FIG. 7, the interface 700 includes content relating to hearing that is part of chapter 19, section 5. The video textbook may also include a "Concepts to Review" section that displays related concepts that are useful to review for the topic at hand. In the example shown in FIG. 7, the concepts to review include activation potential 704, ion channel 706 and the nervous video textbook environment 708. These concepts all relate in some manner to hearing.

Figure 8:
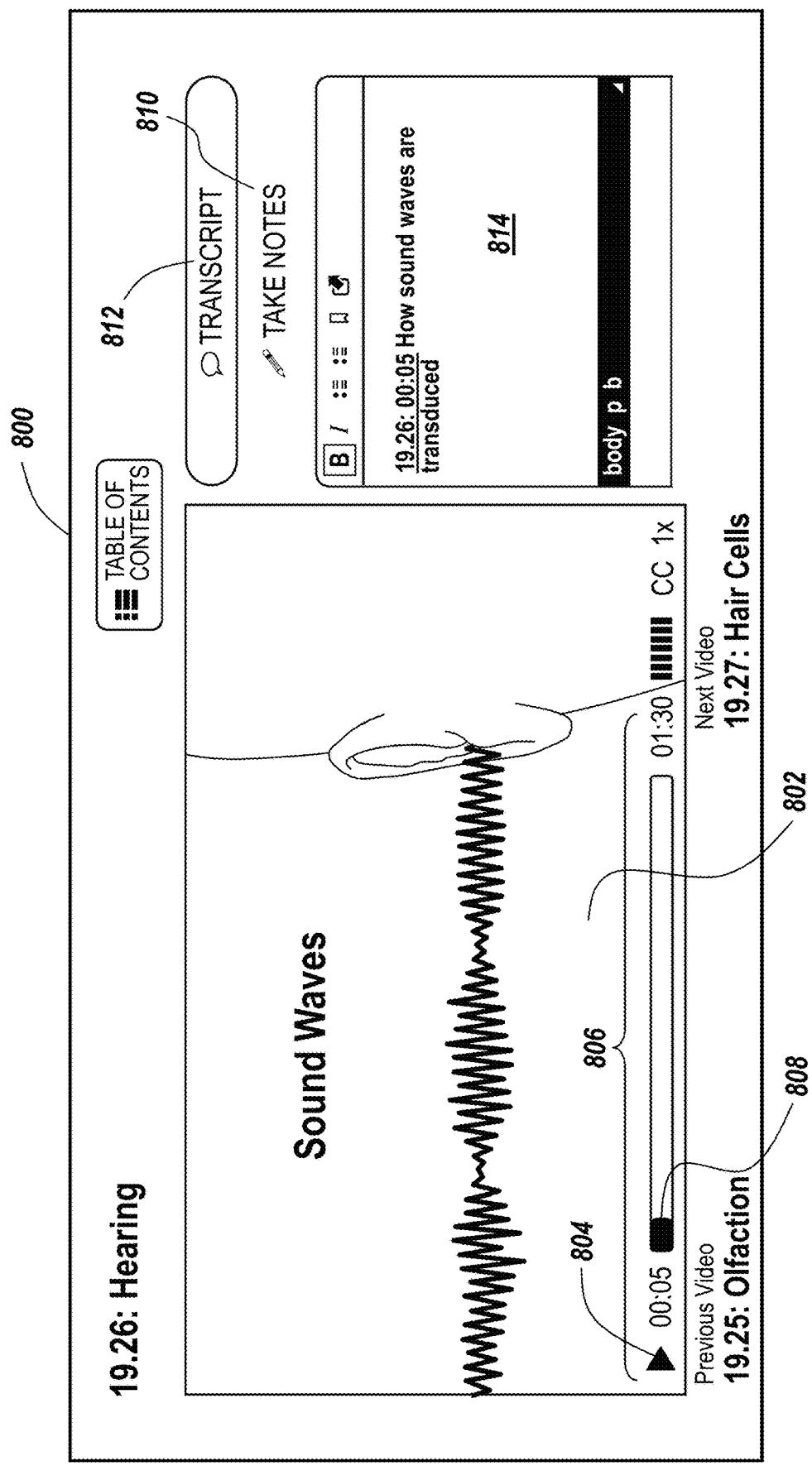
FIG. 8 illustrates an example of a video and notes relating to a video in a video textbook.

FIG. 8 shows an example where the interface 800 is displaying a video 802 relating to hearing under chapter 19, section 26. The video has a play button 804 as well as a video timeline 806. The darkened portion 808 indicates how much of the video has played and the current position within the video. The timer in this example case is currently at five (00:05) seconds, and the video is one minute and thirty seconds long. The interface 800 shown in FIG. 8 has a transcript button 810 which may cause the transcript of the video to be displayed. The interface 800 also includes a "take notes" button 812 which may be activated so that the notes taking section 814 open and may be used to enter notes.

The notes shown in the notes taking section 814 include an indication of the video and also an indication of chapter and section. Thus, the notes shown in FIG. 8 designate that the notes relate to chapter 19, section 26.

The notes may also be timestamped. The timestamping in this case entails specifying a point in the video to which the notes relate. In this example case, a timestamp of five seconds is provided as the notes relate to the video at the five second mark. A user interface element, such an icon may be activated in order to add the timestamp to the notes.

Figure 9:
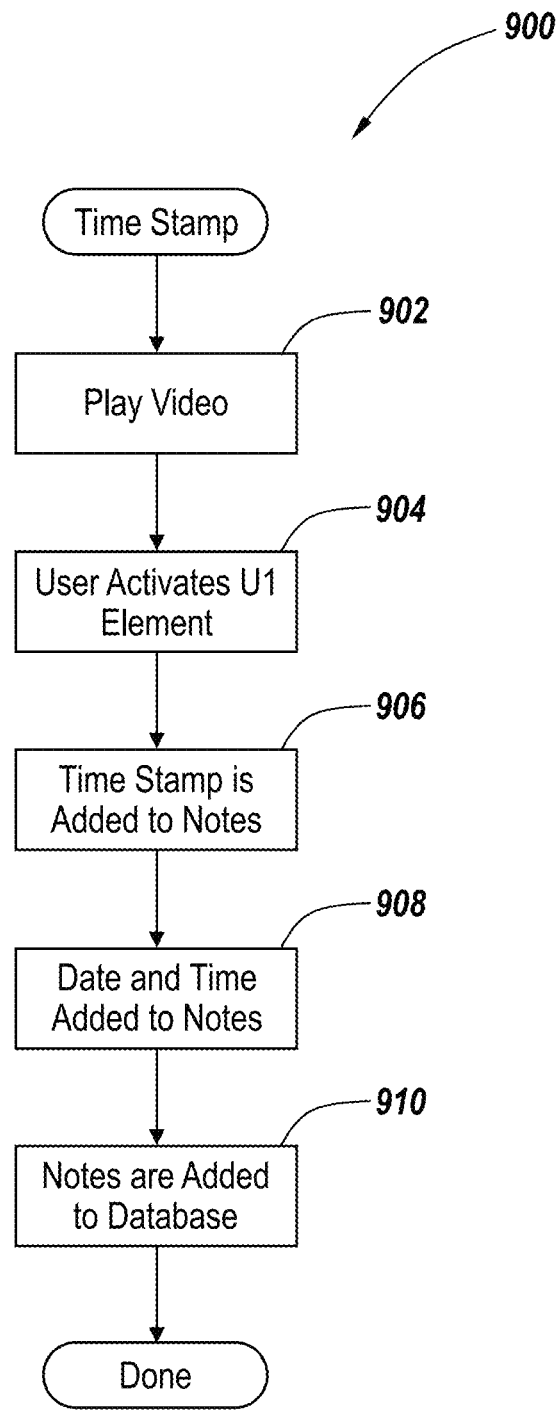
FIG. 9 is a flowchart illustrating steps that are performed regarding a timestamp for notes relating to a video.

FIG. 9 provides a flowchart of the steps that are performed for such timestamping. Initially the video is played (step 902). The user then activates the user interface element (step 904). As is discussed above, the user interface element may take different forms, such as an icon, a menu item, etc. The timestamp is then added to the notes in step 906. Additional information may be added by the video textbook environment to the notes. For example, the video textbook environment may add the date and time at which the notes were taken (step 908). This step is not obligatory and may be optional in some embodiments. These notes are then saved for subsequent access. The notes may be saved in persistent storage. In example shown in FIG. 9, the notes are added to a database (step 910), which will be described in more detail below.

Figure 10:
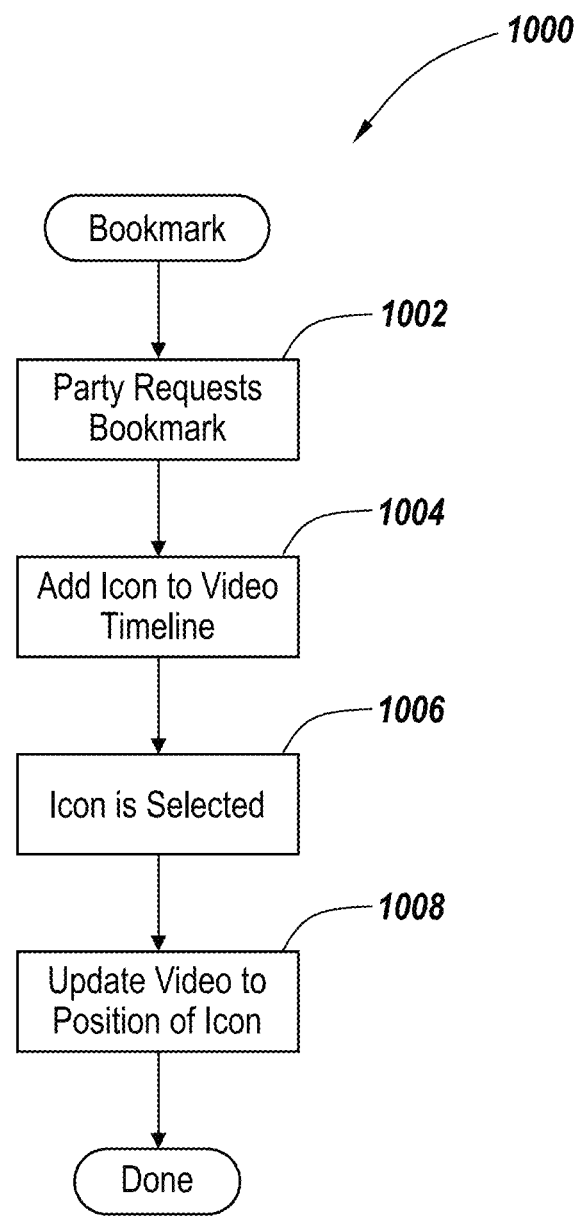
FIG. 10 is a flowchart illustrating steps performed relating to a bookmark.

The video textbook environment allows the user to bookmark a position in a video. This bookmark may then be activated to return to the specified video location. FIG. 10 shows a flowchart 1000 illustrating the steps performed for such bookmarks. Initially, the party requests a bookmark (step 1002). This request may take different forms, such as activating a bookmark user interface element, making a menu selection or performing an action, such as a mouse click or a designated keystroke. An icon is then added to the video timeline in exemplary embodiments (step 1004).

Figure 11:
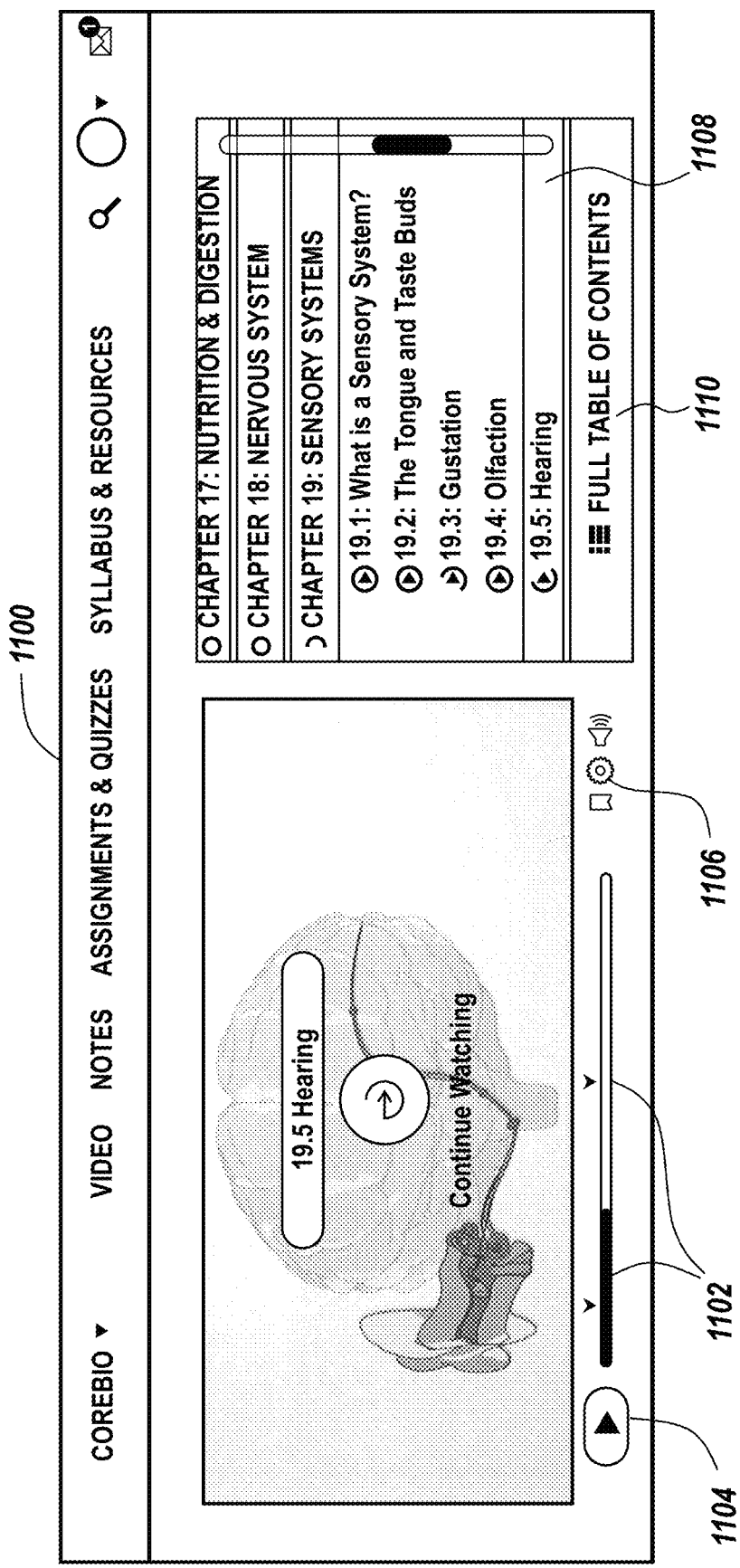
FIG. 11 illustrates an example of a video that has been bookmarked.

FIG. 11 shows an example of a video timeline in which icons 1102 have been added to designate where bookmarks have been positioned. Interface 1100 shown in FIG. 11 also includes a bookmark icon 1106 that may be selected to create a new bookmark. This same bookmark icon 1106 may be used to create a times stamp in notes.

As shown in FIG. 10, the resulting bookmark may be subsequently used by the user to return to the specified video position. In the example shown in FIG. 10, the icon, such as one of icons 1102 in FIG. 11, is selected in step 1006. The video is then updated to the position of the icon (step 1008). This may be realized by sending appropriate commands to the video or media player.

FIG. 11 also illustrates that a partial portion of the table of contents may be displayed in a scrollable form in some embodiments. In this instance, the chapters of the video textbook are displayed in a scrollable list where a given chapter may be selected to expand to illustrate the sections of the chapter. A button 1110 may be provided to display the full table of contents.

Figure 12:
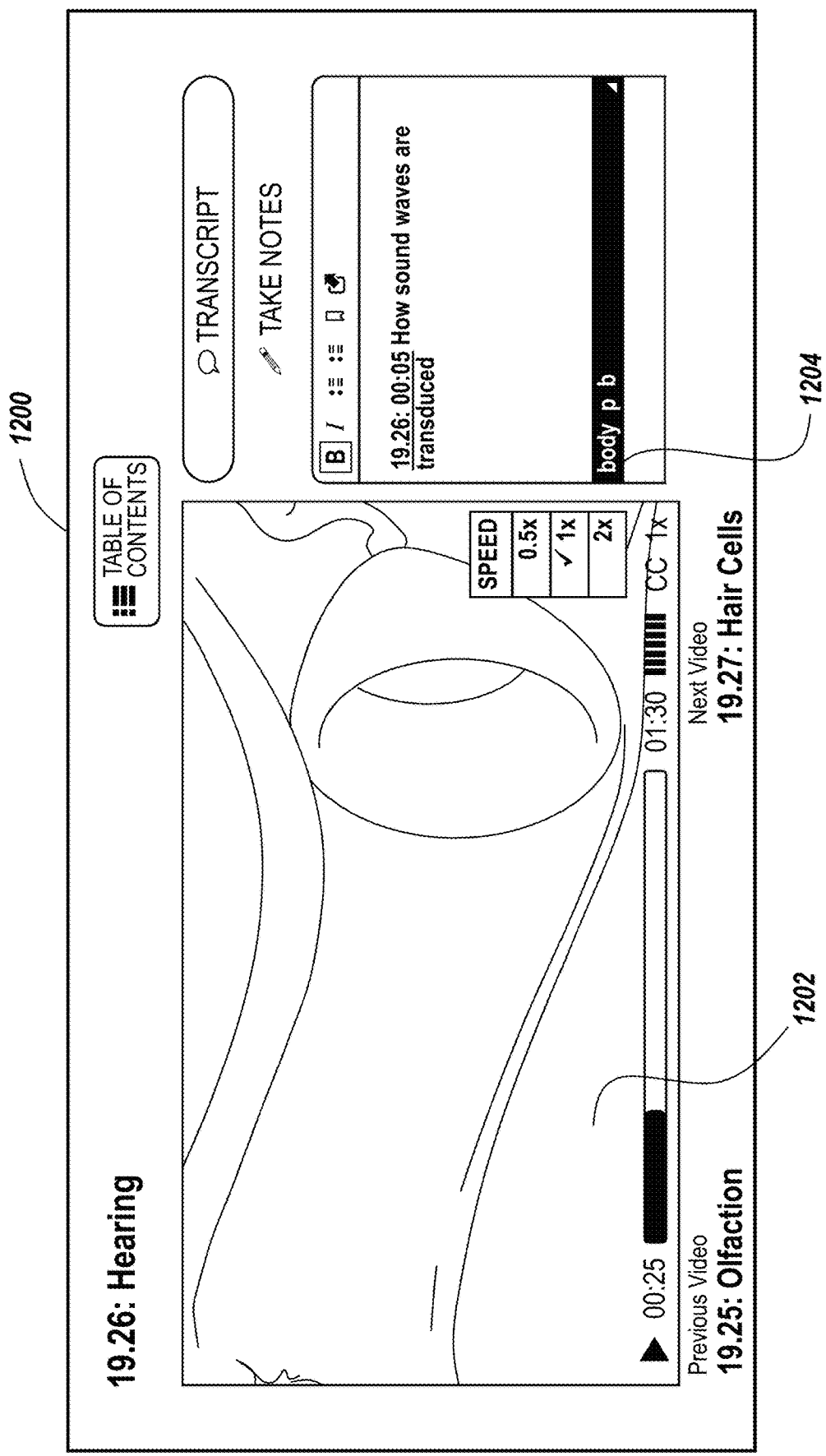
FIG. 12 illustrates an example of adjustment of a speed of a video in a video textbook.

The user may also have control over the speed at which the video is displayed. In an example shown in FIG. 12, the interface 1200 includes a video 1202 that has a speed list 1204 that may be expanded to illustrate the speed options. In the example shown in FIG. 12, a half speed option (0.5×), a full speed option (1×) and a double speed option (2×) are presented on a list. The full speed option has been selected in FIG. 12 and as indicated by the highlighting.

The interface is provided by web pages sent to a chart over a network, such as the Internet. The web pages are delivered as HTMC pages, XMC pages or in other suitable formats. These pages are rendered by a web browser at the client. The web pages reference items stored in a storage such as a database and may include active elements, such as user interface elements with which a user may interact. The database provides some of the content of the web pages.

Those skilled in the art will appreciate that other storage technologies and indexing technologies may be used in some instances.

The database provides an especially useful mechanism for storing and retrieving different information together. The content may be indexed and queryable.

Figure 13:
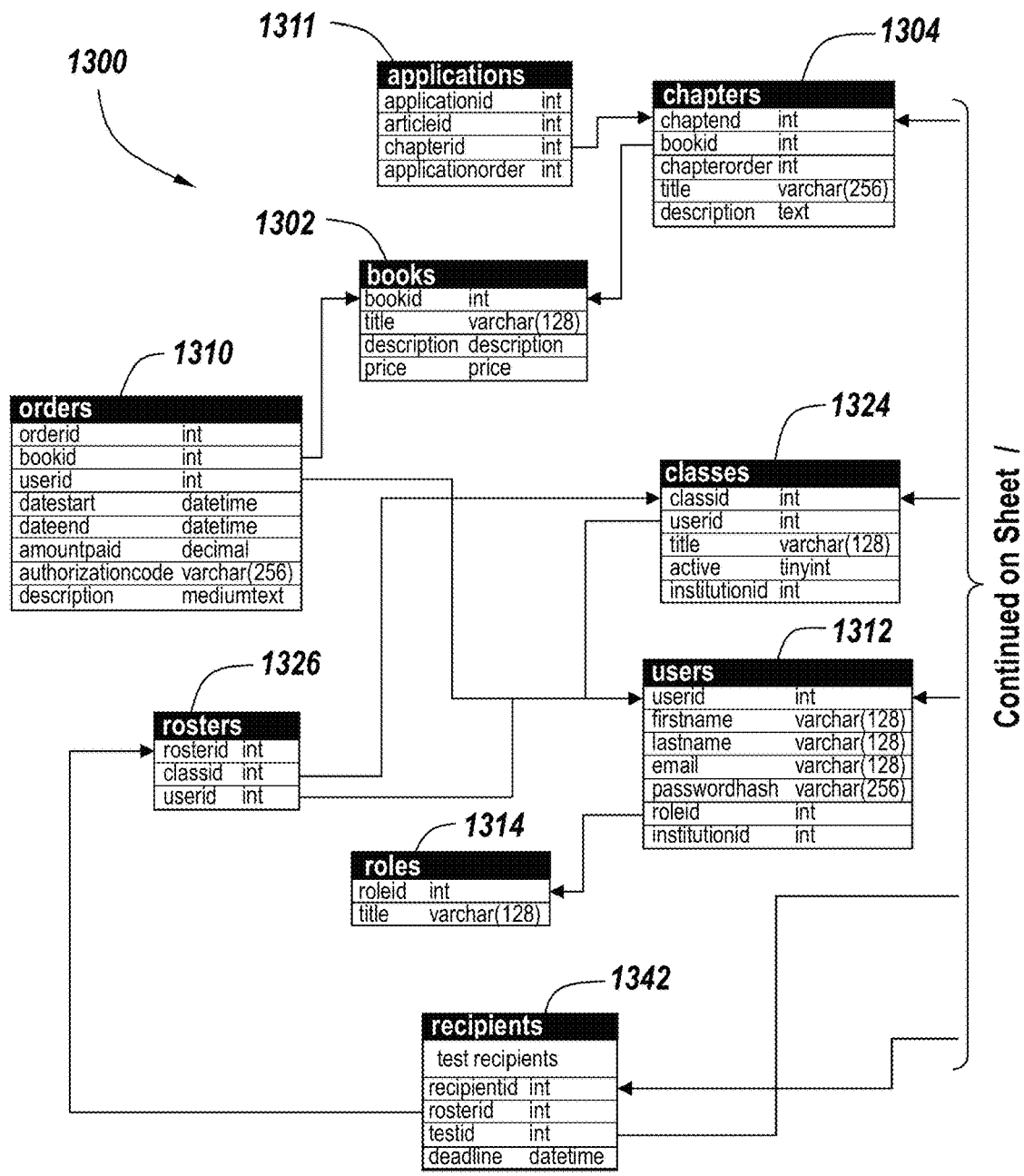
FIG. 13 illustrates a schema suitable for a database for practicing exemplary embodiments.
Figure 13:
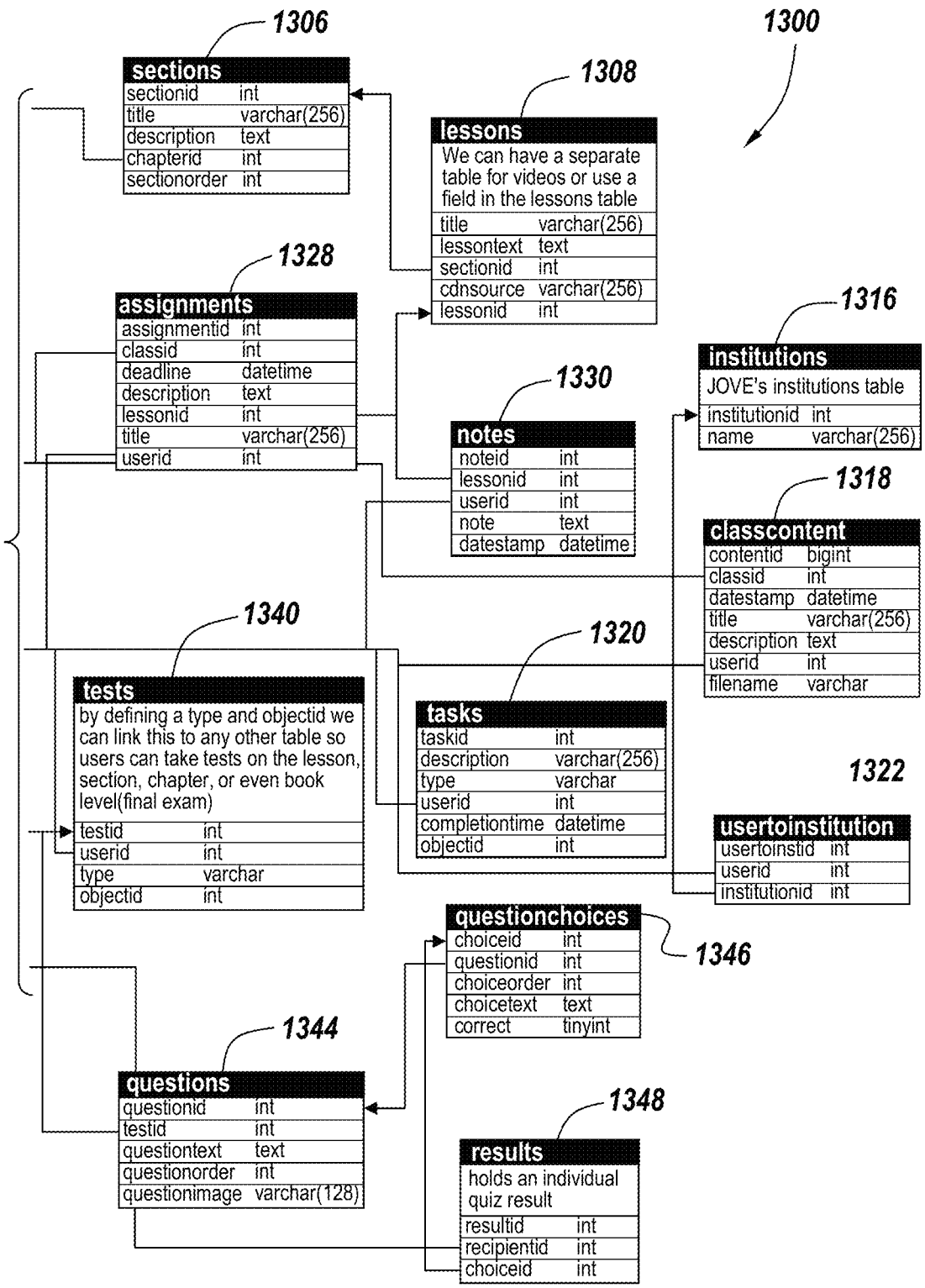

FIG. 13 shows an example of a schema for such a database. The schema 1300 includes a number of tables holding different types of records. A first group of these tables relate to the video textbooks. One such table is books table 1302. Each record in the books table may hold information regarding the book, such as descriptive information.

A chapters table 1304 may be provided to hold information regarding the various chapters of an associated video textbook. Each chapter has an associated record that may store identifying and descriptive information for the chapter.

A sections table 1306 may be provided for holding sections records for sections. Each sections record may hold descriptive and identifying information for the section.

A lessons table 1308 may be provided for holding lessons records. Each lessons record may hold a title and text for the associated lesson and identifying information.

The schema 1300 may also include a number of tables that relate to various administrative portions of the video textbook environment. The tables may include an orders table 1310 that holds information for each order of the video textbook. Each record in the orders table may hold descriptive and identifying information regarding the order.

A users table 1312 may be provided to hold information regarding users of the video textbook. This information may include personal information regarding the user.

Each record in the roles table 1314 may hold information regarding the role of an individual (e.g. student, etc.).

An institution table 1316 may be provided to hold information regarding an educational institution.

The database may also include a class content table 1318. As was mentioned above, an instructor may provide various class content to students during the course of teaching a class. This table is used for such class content.

As was also mentioned above, an instructor may assign various tasks to the students. The task table 1320 may hold information regarding such tasks.

A classes table 1324 holds information with regard to each class. Each classes record may include identifying and descriptive information regarding the class.

A rosters table 1326 may hold records regarding class rosters.

An instructor may assign students various assignment. In order to keep track of the assignments, the database may include an assignments table 1328.

A notes table 1330 may be provided that holds information regarding notes entered by students. Each notes record may include information that associates the notes with the user, and the content of the notes may be included in the record. A date stamp may be included in the record as was discussed above.

The schema 1300 may also include information regarding tests. As such, a tests table 1340 may be provided where each record relates to a particular test.

The recipients table 1342 holds information regarding recipients of a test, such as students.

A questions table 1344 may hold questions that may be added to tests. Each record may include information that identifies the order of the question within the test and identifying information.

A question choices table 1346 may be provided to hold information regarding choices for selection for a given questions. For each choice, there is a choice record.

A results table 1348 may be provided to hold information regarding results of a test or quiz. This record captures the choice by the recipient for the given question.

The database is used in numerous fashions to generate and store content and to query content. One uses the database is helpful and relates to the notes. The content in the web interface may in large part be generated from the database.

Figure 14:
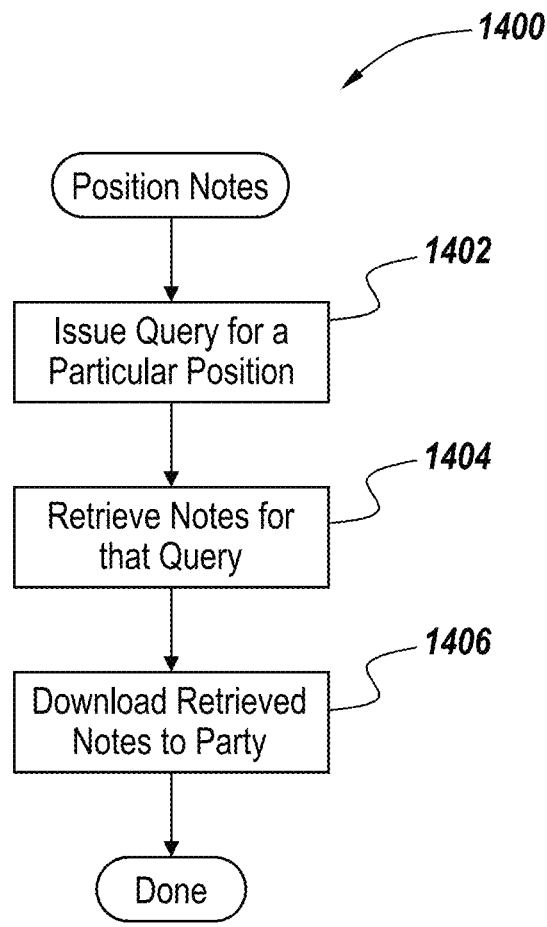
FIG. 14 is a flowchart illustrating steps that are performed to obtain notes for a given partition.

FIG. 14 shows a flowchart 1400 of steps that are performed to obtain the notes for a given partition. As was discussed above, partitions may take many forms, including chapters, sections and lessons. The video textbook environment is able to issue a query for a particular partition (step 1402). The database management video textbook environment for the database then retrieves the notes that satisfy the query (step 1404). Thus, the video textbook environment may access the records in the notes table 1330 to obtain the appropriate notes. For example, if the partition is a chapter, the video textbook environment may retrieve notes for all notes that have the associated chapter id. The retrieved notes are then downloaded to the party or more generally made available to the party (step 1406). These may take the form of a separate document or may be downloaded as individual documents. Alternatively, the notes may be displayed on a user interface for perusal by the user.

Figure 15:
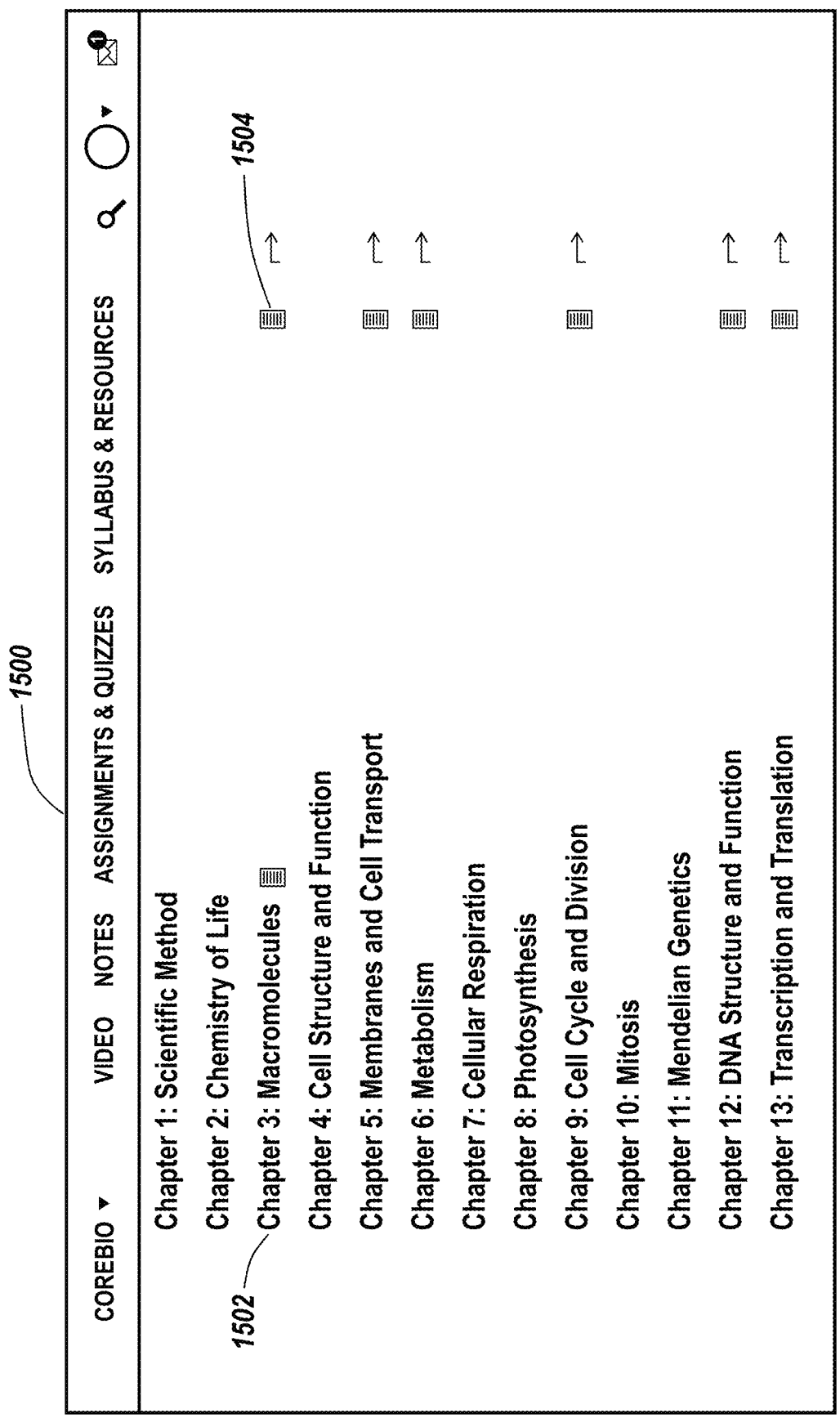
FIG. 15 illustrates an example interface for obtaining notes for a chapter.

FIG. 15 shows an example of an interface 1500 in which there is an entry for each chapter. Entry 1502 is for chapter 3 and includes a document icon 1504 indicating that the notes for chapter 3 may be downloaded by activating the appropriate user interface element.

The video textbook environment may allow a user to look at various content that is useful for the class in a fashion like that shown in FIG. 16. The interface 1600 in FIG. 16 includes class materials 1602, lecture notes 1604 and additional resources 1606. The class materials may include information such as a syllabus, required texts and materials. The lecture notes 1604 may include slides presented by an instructor on a specified date. The additional resources may take any of a number of different forms including in the form of a video, document, link or the like.

Figure 17:
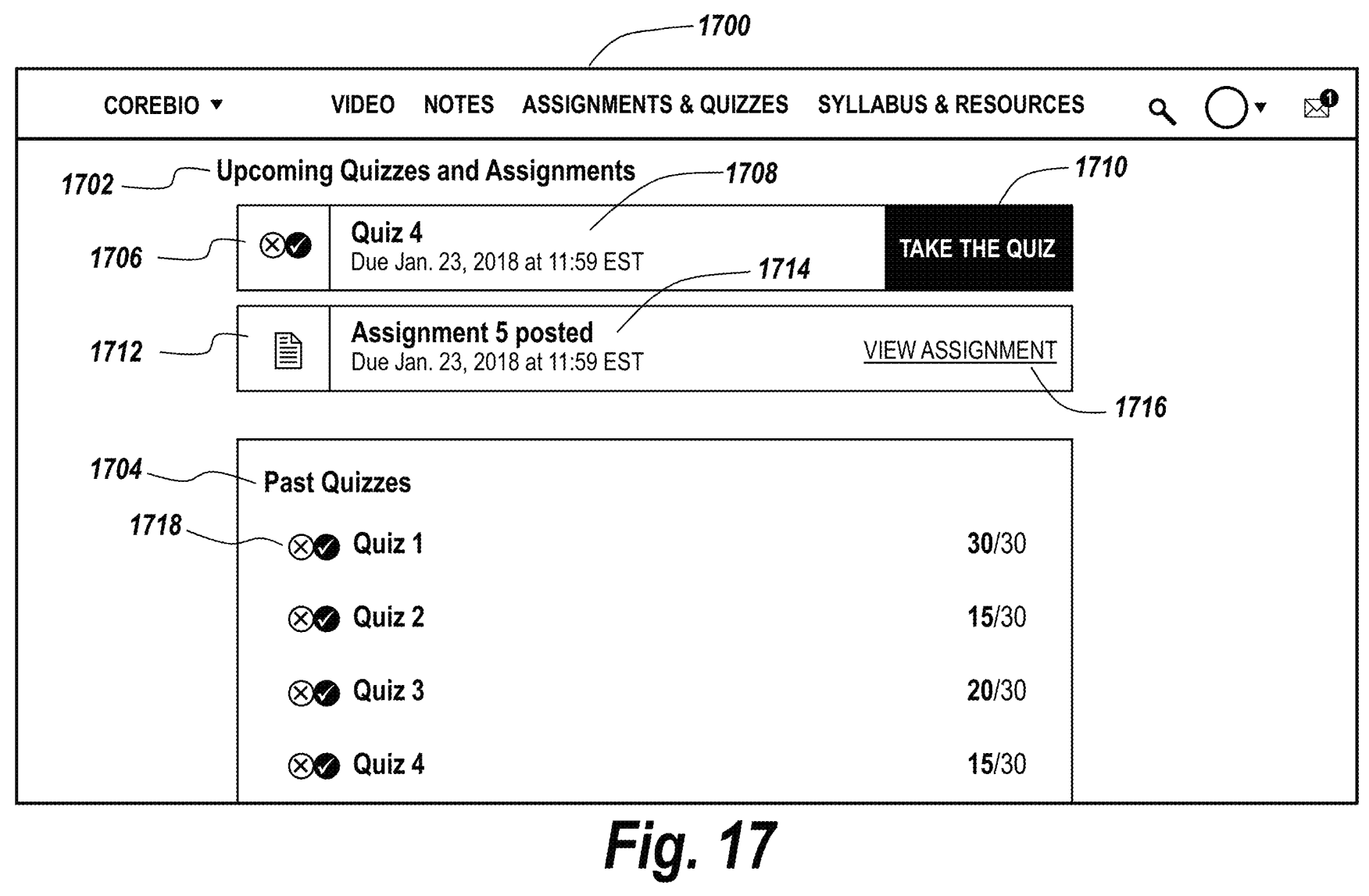

The video textbook environment also enables a student to review quizzes and assignments in a convenient fashion. As shown in FIG. 17, the interface 1700 includes a list of upcoming quizzes and assignments 1702. In the example shown in FIG. 17, the element 1706 indicates that the quiz has not been taken and provides information 1708 regarding the quiz. In particular, the title of the quiz and the due date are shown in this example. A button 1710 may be provided to allow the user to take the quiz. The video textbook environment retrieves the quizzes and assignments from the database for the user for display.

The upcoming quiz and assignment also shows an entry 1712 for an assignment. Information 1714 regarding the assignment and its due date are shown. A link 1716 is provided to view the associated assignment.

The interface 1700 also shows a listing of past quizzes 1704. For example, entry 1718 indicates that quiz one has been taken and that a perfect score 30 out of 30 was obtained.

Figure 18:
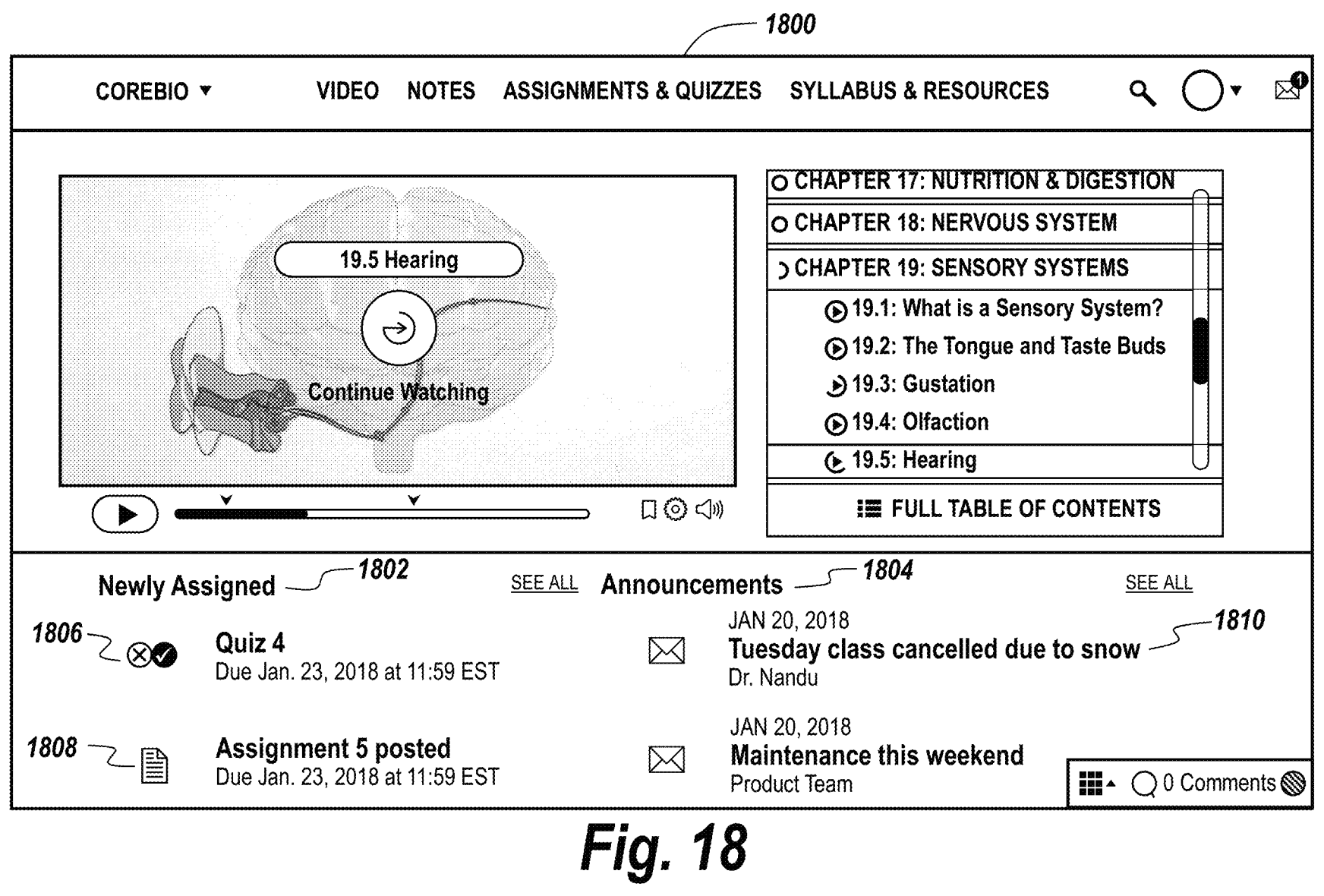

FIG. 18 shows an additional portion the user interface 1800 in which the page has been scrolled further downward relative to the depiction in FIG. 11. In this portion of the user interface 1800, the video section is provided but also a "Newly Assigned" section 1802 is provided and an "Announcement" section 1804 is provided. The "Newly Assigned" section 1802 shows that a quiz 1806 and an assignment 1805 were recently posted within specifiable time window. These assignments may be retrieved from the database for the class for a given time window. The "Announcements" section 1804 holds various announcements including an announcement that a class is canceled due to snow 1810. These announcements may take the form of messages that may be opened by a user.

Figure 19:
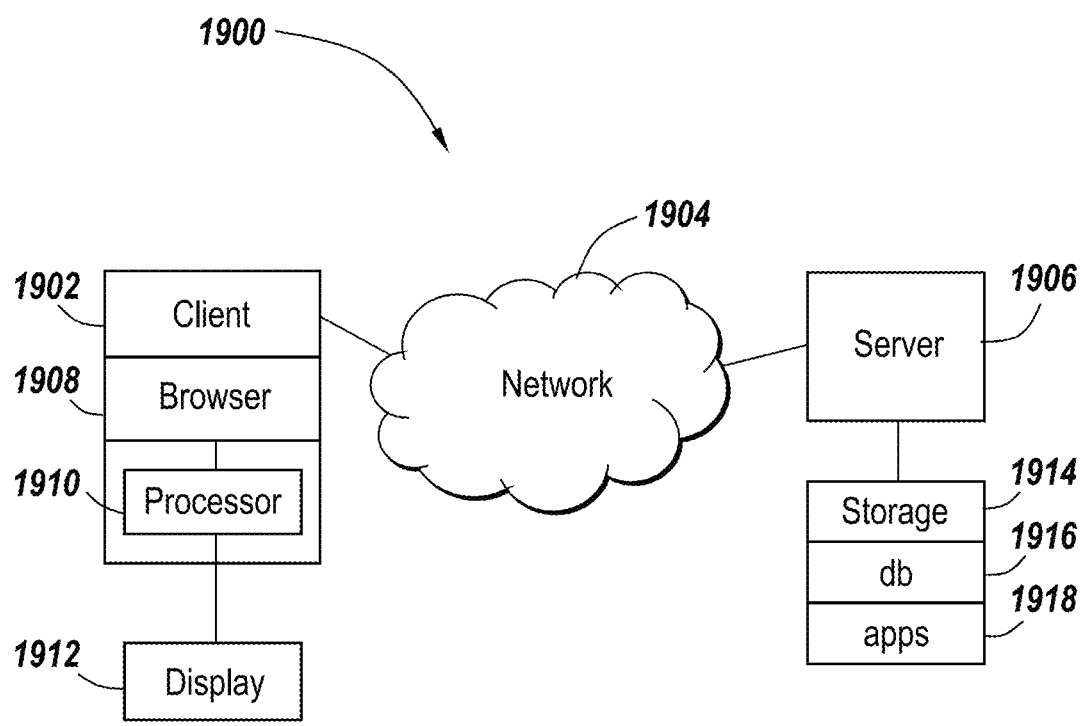
FIG. 19 illustrates a distributed environment suitable for practicing the exemplary embodiments.

FIG. 19 shows an example of a distributed environment 1900 that is suitable for practicing the exemplary embodiments. As shown in FIG. 19, the distributed environment 1900 includes a client 1902, a network 1904 and a server 1906. Client 1902 may take the form of any of a number of different computing devices, including a desktop computer, a laptop computer, a tablet computer, a smart phone or other computational device that is able to provide the requisite functionality. In the example shown in FIG. 19, the client 1902 includes a web browser 1908 that can render web pages such as the Internet, with the server 1906. The clients 1902 may include a processor 1910, such as a microprocessor, a field programmable gate array (FPGA), an application specific integrated circuit (ASIC), a controller, a graphical processor unit (GPU) or other processing logic for performing the desired functionality. The client 1902 may include access to a display 1912 for displaying video images and other content. It is presumed that the browser 1908 has capability of using HTTP commands to communicate over the network 1904 to the server 1906. The browser 1908 may process HTML pages, XML pages or other content.

The server 1906 has access to a storage 1914 that includes the database 1916 as well as one or more applications 1918.

Figure 20:
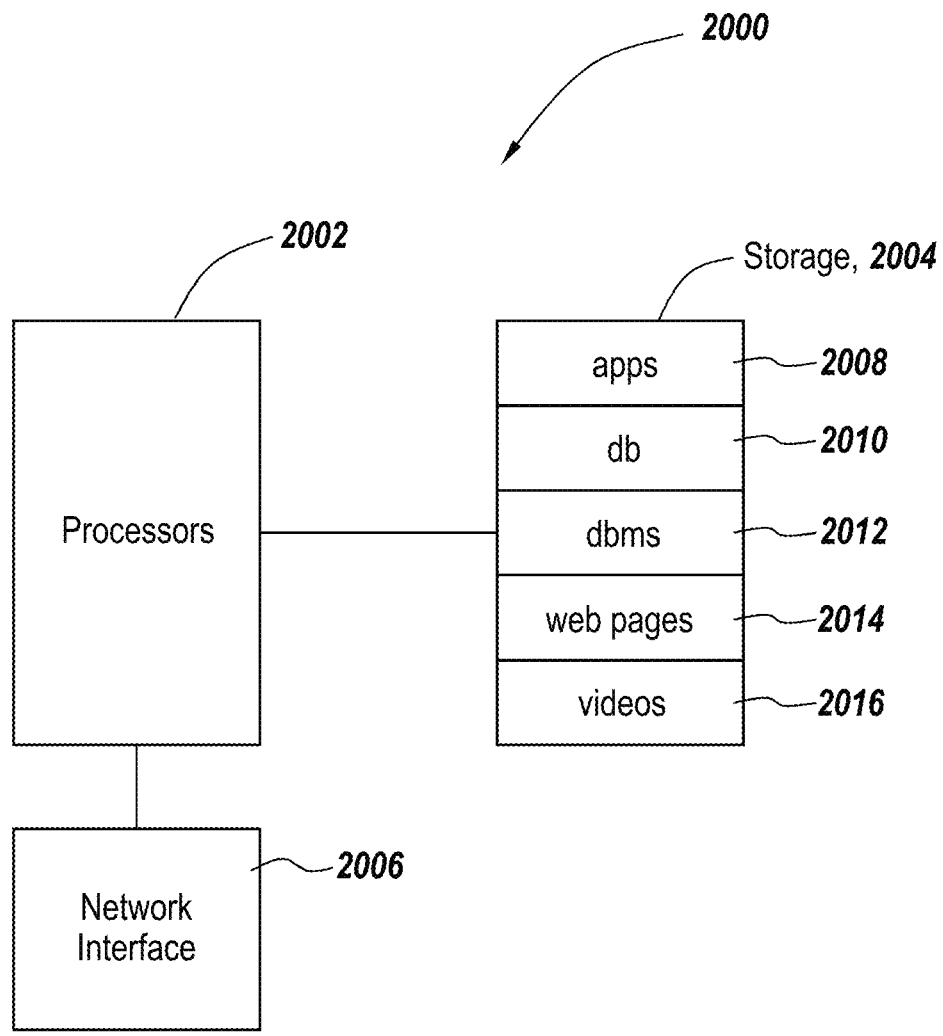
FIG. 20 illustrates an example of components of the server in exemplary embodiments.

FIG. 20 shows the server in more detail. The server 2000 includes one or more processors 2002 and has a network interface 2006 for communicating with the network 1904 or a local area network that has access to network 1904. The processors may take many forms, such as those discussed above relative to the client. The storage 2004 may hold applications 2008, a database 2010, a database management video textbook environment 2012, web pages 2014 and various videos 2016. The storage may take the form of magnetic storage, optical storage, solid state storage or the like. The storage 2004 may include non-transitory computer readable storage media. The medium may be removable or not. The storage 2004 may include both primary storage and secondary storage. Those skilled in the art will appreciate that a number of different types of storage may be used to practice the exemplary embodiments described herein.

The database may take many different forms, but in the exemplary embodiments the database is a relational database that includes relational tables as described above. The database management video textbook environment may be provided to issue queries relative to the database as well as to manage the storage within the database. The applications 2008 may include web applications for providing the video textbook environments and provide a video textbook to students via a client device 1902. The videos 2016 may be stored separately or may be stored as part of the web pages or within the database 2010.

While the present invention has been described with reference to exemplary embodiments herein, those skilled in the art will appreciate the various changes in form and detail may be made without departing from the intended scope of the present invention as defined in the appended claims.

What is claimed as new and desired to be protected by Letters Patent of the United States is:

1. A method, performed by at least one processor of a computer system, comprising:
    receiving notes regarding a first digital portion of a digital content entered via a web interface for a digital content environment, wherein the digital content is partitioned into a plurality of logical partitions;
    storing the notes regarding the first digital portion in a database on a storage and information identifying that the first digital portion belongs to a selected partition of the plurality of partitions;
    receiving notes regarding a second digital portion of the digital content via the web interface;
    storing the notes regarding the second digital portion in the database and information identifying that the second digital portion belongs to the selected partition;
    issuing a query to the database to retrieve notes stored for the selected partition;
    receiving the notes regarding the first digital portion and the notes regarding the second digital portion in response to the query; and
    providing a user interface element associated with each of the plurality of logical partitions of the digital content, wherein the user interface element includes a plurality of tab elements, and wherein a first one of the plurality of tab elements is directed to related research techniques having content directed to research techniques associated with the logical partition.

2. The method of claim 1, wherein the first digital portion is a video and the digital content is a video textbook.

3. The method of claim 1, wherein the second digital portion is a video and the digital content is a video textbook.

4. The method of claim 1, further comprising forwarding received notes to a party via the web interface.

5. The method of claim 1, wherein the digital content is a digital textbook and the logical partitions include at least one of chapters, sections or lessons.

6. The method of claim 1, wherein a second one of the plurality of tab elements is directed to key terms and concepts of the logical partition and includes content directed to the key terms and concepts associated with the logical partition.

7. The method of claim 1, wherein a third one of the plurality of tab elements is directed to scientists having expertise in the subject matter of the logical partition, and includes content directed to research associated with the scientists.

* * * * *